(12) United States Patent
Hinrichs

(10) Patent No.: US 8,137,078 B2
(45) Date of Patent: Mar. 20, 2012

(54) AXIAL PISTON MACHINE

(75) Inventor: Jan Hinrichs, Friedrichsdorf (DE)

(73) Assignee: ixetic MAC GmbH, Bad Homburg (DE)

( * ) Notice: Subject to any disclaimer, the term of this patent is extended or adjusted under 35 U.S.C. 154(b) by 955 days.

(21) Appl. No.: 11/791,581

(22) PCT Filed: Nov. 17, 2005

(86) PCT No.: PCT/DE2005/002062
§ 371 (c)(1),
(2), (4) Date: May 24, 2007

(87) PCT Pub. No.: WO2006/056167
PCT Pub. Date: Jun. 1, 2006

(65) Prior Publication Data
US 2008/0080986 A1    Apr. 3, 2008

(30) Foreign Application Priority Data
Nov. 25, 2004 (DE) .......................... 10 2004 056 851

(51) Int. Cl.
*F04B 1/12* (2006.01)
*F01B 1/00* (2006.01)
*F01B 3/02* (2006.01)
(52) U.S. Cl. ............................... 417/269; 92/71; 91/499

(58) Field of Classification Search .................. 417/269; 92/12.2, 71; 91/499
See application file for complete search history.

(56) References Cited

U.S. PATENT DOCUMENTS

| 3,592,215 | A | * | 7/1971 | Davis ............................. 137/113 |
| 4,428,718 | A | | 1/1984 | Skinner |
| 5,051,067 | A | * | 9/1991 | Terauchi ..................... 417/222.2 |
| 5,094,590 | A | | 3/1992 | Carella et al. |
| 5,368,450 | A | | 11/1994 | Fujii et al. |
| 5,738,000 | A | * | 4/1998 | Forster ........................ 92/165 R |
| 6,368,070 | B1 | | 4/2002 | Takai |
| 6,416,297 | B1 | * | 7/2002 | Kawaguchi et al. ........ 417/222.2 |
| 7,117,782 | B2 | * | 10/2006 | Murakami et al. .............. 92/156 |
| 7,273,472 | B2 | * | 9/2007 | Peter et al. ..................... 604/155 |

FOREIGN PATENT DOCUMENTS
DE    6935759    12/1969
EP    0990795 A2    4/2000
* cited by examiner

*Primary Examiner* — Charles Freay
(74) *Attorney, Agent, or Firm* — Davidson, Davidson & Kappel, LLC

(57) ABSTRACT

An axial piston machine, especially an air-conditioning compressor for motor vehicles, including a power unit which is rotatably driven by a shaft and in which the rotary movement is converted, via a swash plate, a wobble plate, or a pivot ring, into a fore-and-aft movement of pistons that suction in and compress pressure media. The shaft is mounted in a forward, first axial bearing, among other things.

8 Claims, 2 Drawing Sheets

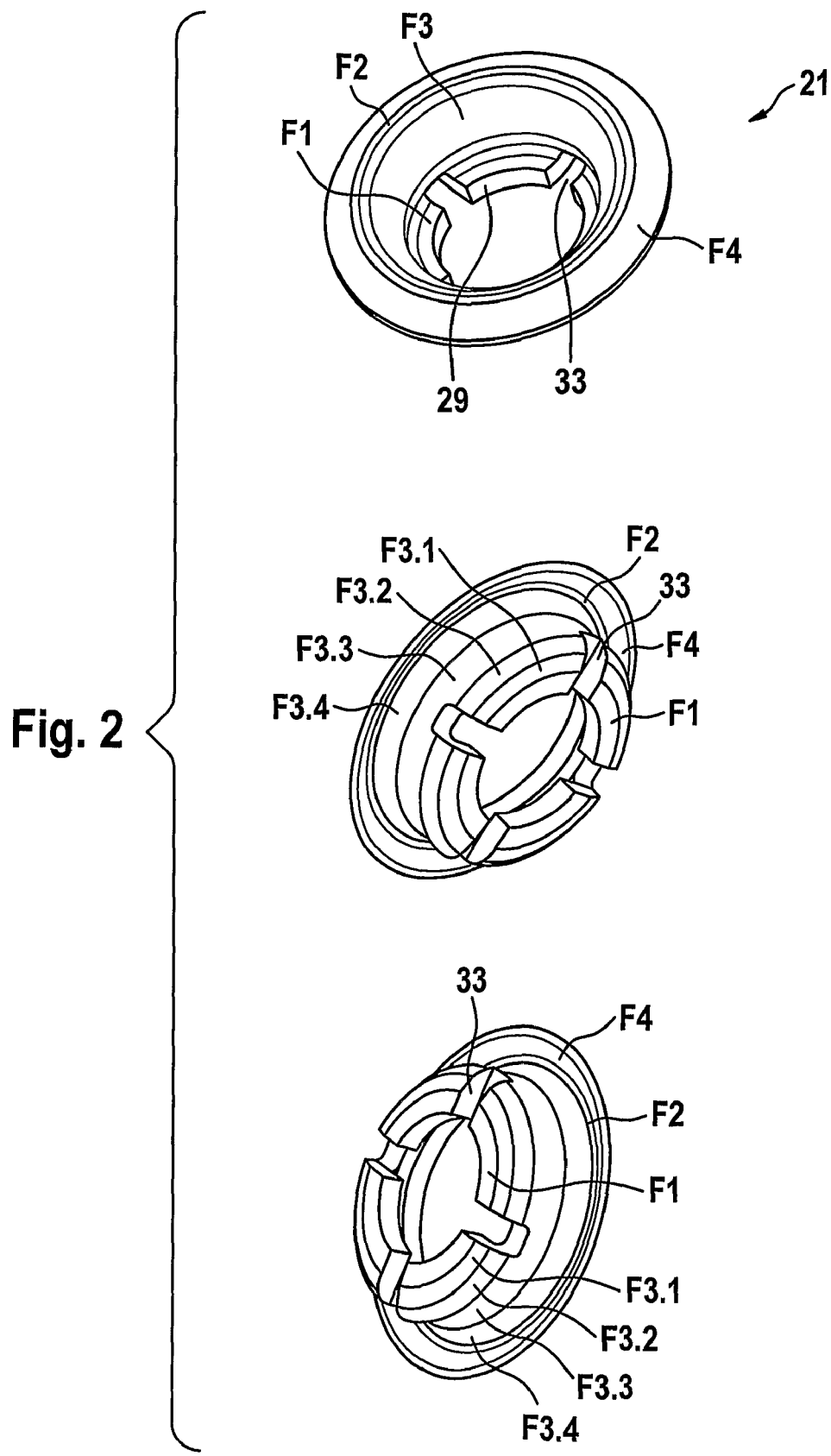

AXIAL PISTON MACHINE

The present invention relates to an axial piston machine, in particular to an air-conditioning compressor for motor vehicles, having a power unit which is rotationally driven by a shaft and in which the rotational motion is converted via a pivot ring, a swash plate or a wobble plate, or via a gear unit performing essentially the same function, into a reciprocating motion of pistons which draw in and compress pressure media, the shaft being supported, inter alia, in a front, first axial bearing.

BACKGROUND

Axial piston machines of this kind are generally known. A disadvantage associated with these machines is that, in the unpressurized state or at low housing pressures and high axial accelerations, the shaft can potentially lift off from the front axial bearing.

In addition, axial piston machines are known which have a second, rear axial rolling-contact bearing at the opposite end of the shaft. The second axial rolling-contact bearing leads to an increase in the component part costs and in the manufacturing costs for a machine of this kind, and must also exhibit suitable adjustability characteristics.

SUMMARY OF THE INVENTION

It is, therefore, an object of the present invention to devise an axial piston machine which will overcome these disadvantages.

The present invention provides an axial piston machine having a power unit which is rotationally driven by a shaft and in which the rotational motion is converted via a pivot ring, a swash plate or a wobble plate, or via a gear unit performing essentially the same function, into a reciprocating motion of pistons which draw in and compress pressure media, the shaft being supported, inter alia, in a front, first axial bearing, in accordance with the present invention, an elastic, resilient, one-piece axial fixing and bearing device, which preloads the shaft against the front first axial bearing, acting on the shaft in the area of the rear end opposite the front axial bearing. An axial piston machine is preferred in which the axial fixing and bearing device is braced, on the one hand, axially against the shaft and, on the other hand, axially against a housing component, for example against a valve-plate device, a cylinder block, or a cylinder head.

In addition, an axial piston machine is preferred in which an axial fixing and bearing device is designed as a molded plastic part, in particular one made of PA 6.6 material.

An axial piston machine is also preferred in which the axial fixing and bearing device has an axial annular contact surface F1 for the shaft and an axial annular contact surface F2 for the valve-plate device, the cylinder block, or the cylinder head, contact surfaces F1 and F2 being joined to one another by an annular surface F3 that is curved in an approximately tulip shape and is resilient in the axial direction. Equally preferred is an axial piston machine in which, radially outside of contact surface F2, the axial fixing and bearing device has a frustoconical, thin-walled outer peripheral surface F4 which rests radially in a recess of the cylinder block, the cylinder head, or the valve-plate device.

The present invention provides that the molded plastic part is subject to a slight degree of intentionally permitted wear that is due to the purposeful use of elastic and plastic characteristics, while taking into consideration the creep behavior which is used to adjust the molded plastic part to its axial installed length. Here, the advantage is derived that, in comparison to known axial bearings, no adjustment procedures are required when using the molded plastic part according to the present invention. It is generally an advantage of the present invention that the one-piece axial fixing and bearing device element eliminates the need for a second axial bearing, as well as for a resilient contact-pressure device and for a vibration damping in the axial direction.

In addition, an axial piston machine is preferred in which the axial fixing and bearing device is used as a shipping brace. Here, the advantage is derived that, in the unpressurized and non-operating state, the shaft is secured against axial displacements caused by impacts, and the molded plastic part counteracts any lifting off from the front axial bearing, both in the unpressurized state, as well as during operation.

BRIEF DESCRIPTION OF THE DRAWINGS

The present invention is described in the following with reference to the figures, which show:

FIG. 2 the axial fixing and bearing device in a plurality of three-dimensional representations.

DETAILED DESCRIPTION

Figure 1:
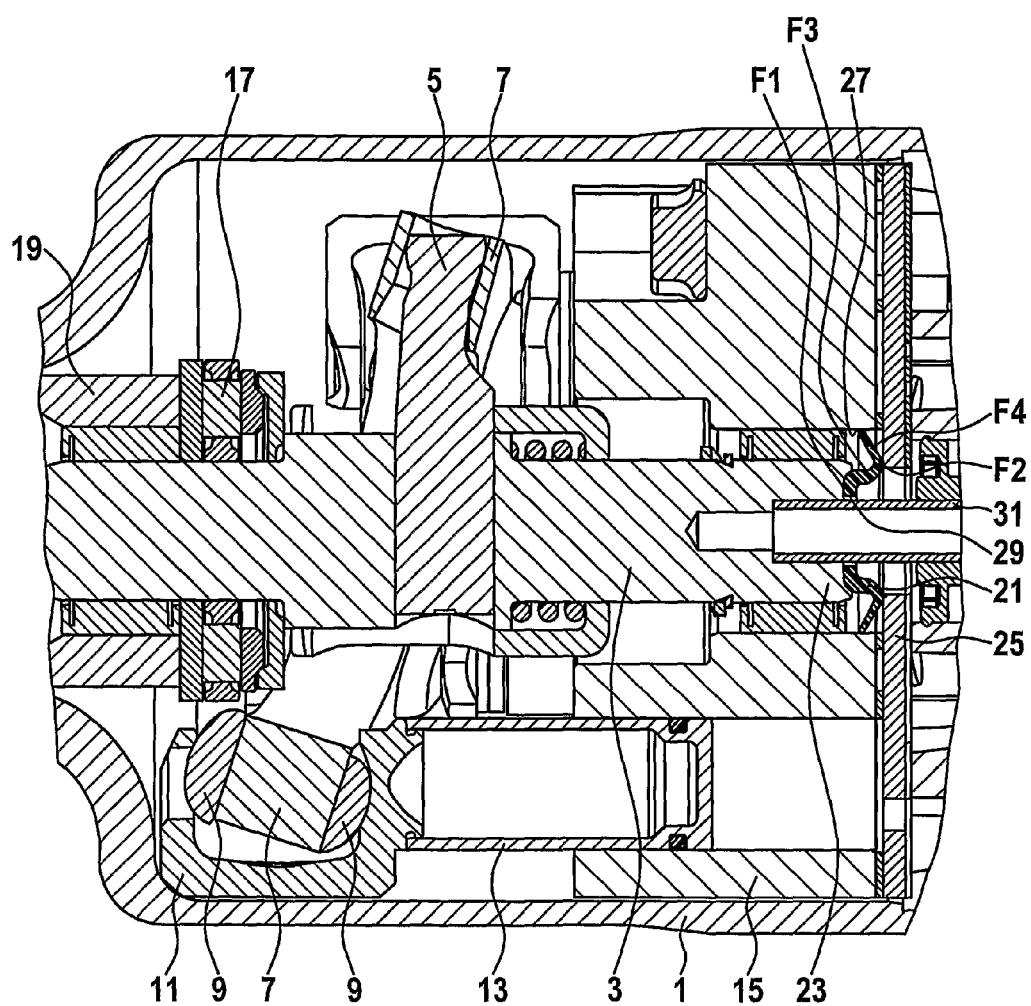
FIG. 1 a cross section through one portion of an axial piston machine, including the installed axial fixing and bearing device.

Located within a compressor housing 1 in FIG. 1 is a drive shaft 3 whose rotational motion sets a driving pin 5 into rotation, which, in turn, sets a so-called pivot ring 7 into rotation. In this context, pivot ring 7 in this machine may assume various angular positions and thus vary the displacement volume of the compressor. Sliding shoes 9, which are disposed within a piston brace 11 of a piston 13, glide on rotating pivot ring 7. Piston shoes 9 execute wobbling movements within brace 11 of piston 13, the rotational motion of pivot ring 7 being converted into a reciprocating motion of pistons 13. Pistons 13, in turn, reciprocate within a cylinder block 15 and, in the process, draw in a refrigerant, compress it and expel it into the high-pressure zone of an air-conditioning system. Since pistons 13 apply corresponding axial forces to pivot ring 7 and thus to shaft 3 during this suction and compression work, these axial forces must be absorbed via an axial bearing 17 in the front shaft region. In most operating modes, the axial forces act in such a way that axial bearing 17 is always pressed against housing part 19 by the axial forces occurring in the shaft. However, in the unpressurized state of the operation or at low housing pressures and at high axial accelerations of pistons 13, shaft 3 can potentially lift off from bearing 17. Therefore, in accordance with the present invention, a molded plastic part 21, thus the so-called axial fixing and bearing device, is located between shaft end 23 opposite axial bearing 17, and a housing part, in this case valve plate 25. Molded plastic part 21 preloads the shaft against bearing 17 and thus counteracts any lifting of shaft 3 off of bearing 17. In this context, due to its elastic characteristics and a slight degree of intentionally permitted wear, which occurs as the result of plastic deformation and deliberately utilized creep behavior, molded plastic part 21 is designed to be a component that is readily adaptable to the axial length of the installation space between shaft end 23 and valve-plate device 25. Molded plastic part 21 is designed in such a way that an axial, approximately annular contact surface F1 is provided for shaft end 23, and an axial, very narrow, annular-shaped contact surface F2 for valve-plate device 25, both contact surfaces F1 and F2 being joined to one another by a resilient annular part F3 that is curved in an approximately tulip shape and is resilient in the axial direction. Due to the elasticity of the elastomer material, which, for example, may be rubber, plastic, or a mixture of the two, this curved, resilient annular part F3 produces the axial contact force for pressing shaft 3 against front axial bearing 17. Starting from bearing surface F2 on the valve plate, molded plastic part 21 continues radially outwardly, merging into frustoconical, thin-walled peripheral surface F4, which rests radially in a recess 27 of cylinder block 15. The radial centering of molded part 21 is thereby provided as well, so that it may have sufficient clearance at its central opening 29 from a shaft bushing 31, with the result that no frictional forces are produced there during rotation. Molded plastic part 21 advantageously eliminates the need for providing a second axial bearing or an additional resilient contact-pressure device at rear shaft end 23, as required in related art methods. Thus, molded plastic part 21 fulfills both functions: that of axial fixing through generation of an axial force and that of an axial bearing. The design as a molded plastic part 21 is conceived to be very simple and economical.

FIG. 2 shows a variant of the molded plastic part, thus of axial fixing and bearing device 21, three-dimensionally and in three views. Axial, annular contact surface F1 for shaft 3, respectively shaft end 23 from FIG. 1, is discontinuous here in the area of central opening 29 due to four cut-in grooves 33, so that pockets for a lubricant passage are formed, as are lubricating slots as well.

Bearing surface F2, which rests against valve plate 25 in FIG. 1, is a narrow annular surface F2 here, as shown in cross section in FIG. 1.

Thus, a slight amount of intentionally permitted wear occurs at the surface in order to facilitate adaptation to the axial length of the installation space of molded plastic part 21. The axial resilience is provided in this case by an approximately frustoconical intermediate surface F3, which joins together the two bearing surfaces F1 and F2. The relatively thin-walled fourth collar F4, thus the frustoconical annular surface, then effects the centering action in recess 27 of cylinder head 15 from FIG. 1. The approximately tulip-shaped peripheral surface F3, as shown in FIG. 1, may be realized by a stepped configuration of surfaces F3.1, F3.2, F3.3 and F3.4, as is apparent in the middle and bottom illustrations in FIG. 2. It is merely important that the arched or conical shape be designed for an appropriate deflection motion and spring action.

Thus, the advantages of the present invention are evident in the axial fixing of compressor shaft 3, in a cost reduction achieved by eliminating the need for a second axial bearing, as well as for the adjusting procedures associated therewith, and, therefore, ultimately in a simplified assembly.

LIST OF REFERENCE NUMERALS 1 compressor housing
3 drive shaft
5 driving pin
7 pivot ring
9 sliding shoes
11 piston brace
13 piston
15 cylinder block
17 axial bearing
19 housing part
21 molded plastic part
23 shaft end
25 valve plate
F1 axial annular contact surface
F2 conically formed contact surface
F3 resilient annular part
F4 frustoconical, thin-walled outer peripheral surface
27 recess of cylinder block 15
29 central opening of molded part 21
31 shaft bushing
33 cut-in grooves

What is claimed is:

1. An axial piston machine comprising:
a shaft;
a power unit rotationally driven by the shaft, the rotational motion in the power unit being converted via a converter into a reciprocating motion of pistons which draw in and compress pressure media;
the shaft supported in a front first axial bearing; and
an elastic, resilient, one-piece axial fixing and bearing device preloading the shaft against the front first axial bearing and acting on the shaft in a rear end area opposite the front first axial bearing;
wherein the axial fixing and bearing device is braced axially against the shaft and axially against a housing component, the housing component being a valve plate device, a cylinder block or a cylinder head,
wherein the axial fixing and bearing device has a first axial annular contact surface for the shaft and a second axial annular contact surface for the valve-plate device, the cylinder block, or the cylinder head, the first or second axial annular contact surfaces joined by a third annular surface curved in a tulip shape and resilient in the axial direction.

2. The axial piston machine as recited in claim 1 wherein the axial piston machine is an air conditioning compressor.

3. The axial piston machine as recited in claim 1 wherein the axial fixing and bearing device is a molded plastic part.

4. The axial piston machine as recited in claim 3 wherein the molded plastic part is made of polyamide 6.6 material.

5. The axial piston machine as recited in claim 1 wherein radially outside of the second axial annular contact surface, the axial fixing and bearing device has a frustoconical thin-walled outer peripheral surface resting radially in a recess of the cylinder block, the cylinder head, or the valve-plate device.

6. The axial piston machine as recited in claim 1 wherein the converter is a pivot ring.

7. The axial piston machine as recited in claim 1 wherein the elastic, resilient, one-piece axial fixing and bearing device abuts the shaft in the rear end.

8. The axial piston machine as recited in claim 1 wherein the axial fixing and bearing device is braced directly against the housing component.

* * * * *